(12) United States Patent
Kobayashi et al.

(10) Patent No.: US 9,217,525 B2
(45) Date of Patent: Dec. 22, 2015

(54) CONNECTING STRUCTURE FOR PRESSURE PIPING

(76) Inventors: Kazumi Kobayashi, Fukuyama (JP); Masato Kobayashi, Fukuyama (JP)

( * ) Notice: Subject to any disclaimer, the term of this patent is extended or adjusted under 35 U.S.C. 154(b) by 103 days.

(21) Appl. No.: 13/979,125

(22) PCT Filed: Oct. 20, 2011

(86) PCT No.: PCT/JP2011/074116
§ 371 (c)(1),
(2), (4) Date: Jul. 10, 2013

(87) PCT Pub. No.: WO2012/096042
PCT Pub. Date: Jul. 19, 2012

(65) Prior Publication Data
US 2013/0285374 A1 Oct. 31, 2013

(30) Foreign Application Priority Data
Jan. 13, 2011 (JP) ................. 2011-004969

(51) Int. Cl.
*F16L 21/00* (2006.01)
*F16L 23/024* (2006.01)
*F16L 25/08* (2006.01)

(52) U.S. Cl.
CPC .............. *F16L 21/00* (2013.01); *F16L 23/024* (2013.01); *F16L 25/08* (2013.01)

(58) Field of Classification Search
USPC .......... 285/417, 403, 404, 369, 371; 403/362, 403/306
See application file for complete search history.

(56) References Cited

U.S. PATENT DOCUMENTS

| 223,835 | A | | 1/1880 | Boyle |
| 544,147 | A | | 8/1895 | Webb |
| 1,377,418 | A | * | 5/1921 | Krogh et al. ................. 403/306 |
| 1,446,789 | A | * | 2/1923 | Dodd ............................ 285/404 |

(Continued)

FOREIGN PATENT DOCUMENTS

| JP | 51-9667 | 3/1976 |
| JP | 54-43010 | 3/1979 |

(Continued)

OTHER PUBLICATIONS

Official Action dated Feb. 12, 2015 issued in connection with U.S. Appl. No. 14/374,140.

*Primary Examiner* — Aaron Dunwoody
(74) *Attorney, Agent, or Firm* — Merek, Blackmon & Voorhees, LLC

(57) ABSTRACT in order to connect pressure pipes in a fluid-tight manner on-site without welding, a plurality of through holes (h1) are provided in a cylindrical sleeve (1a) at separate locations in the lengthwise direction, and with identical angular intervals around the circumference of the cylindrical sleeve without overlapping in the circumferential direction. Non-through holes (h2) in which screw threads have been formed are provided in pressure plates (P1, P2) at locations corresponding to the holes (h1). An insert (2a) has a pair of opposing annular faces (31, b2), and annular ring grooves (b11, b21) are formed respectively in the annular faces (b1,b2) to house O-rings (3). The insert (2a) is inserted into the sleeve (1a), after which the pressure pipes (P1, P2) are inserted, one from either side, into the interior of the sleeve (1a), and bolts (4) are inserted into the plurality of holes (h1) in the sleeve (1a), and screwed onto the screw threads of the pressure pipes (P1, P2).

3 Claims, 22 Drawing Sheets

(56) References Cited

U.S. PATENT DOCUMENTS

| | | | |
|---|---|---|---|
| 2,111,243 A | 3/1938 | Hecht | |
| 2,472,307 A | 6/1949 | Nagel | |
| 3,018,120 A | 1/1962 | Vann | |
| 4,872,713 A * | 10/1989 | Kapgan | 285/381.3 |
| 2014/0367964 A1 | 12/2014 | Kobayashi | |

FOREIGN PATENT DOCUMENTS

| | | |
|---|---|---|
| JP | 58-142476 | 9/1983 |
| JP | 63-20946 | 2/1988 |
| JP | 08-121662 | 5/1996 |
| JP | 10-47539 | 2/1998 |
| JP | 10-281372 | 10/1998 |
| JP | 10-311469 | 11/1998 |
| JP | 10-325491 | 12/1998 |
| JP | 2000-088160 | 3/2000 |
| JP | 2003-180011 | 6/2003 |
| JP | 2005-81490 | 3/2005 |
| JP | 3152172 | 7/2009 |
| JP | 2010-180957 | 8/2010 |
| JP | 2011-127672 | 6/2011 |

* cited by examiner

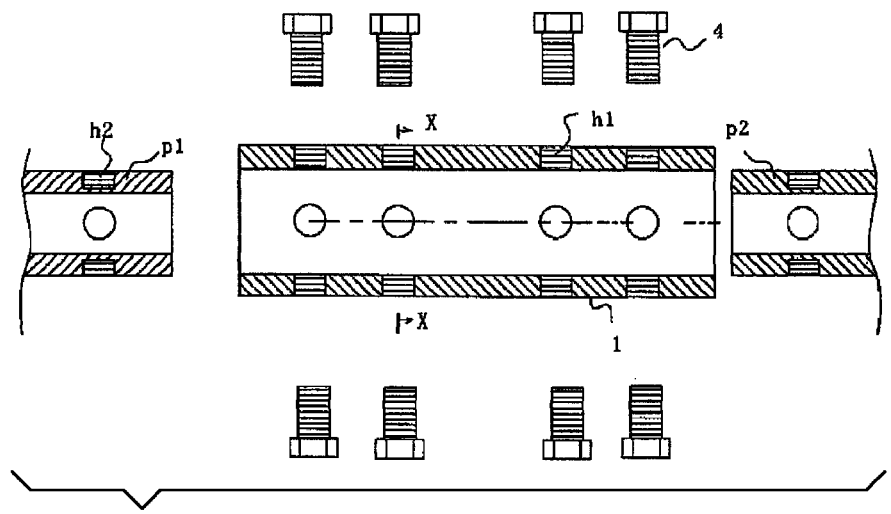
FIG. 1A
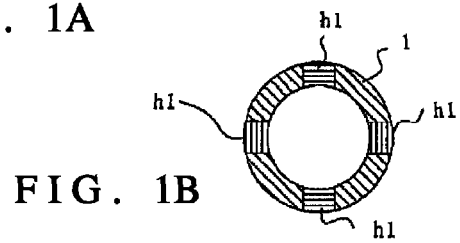
FIG. 1B
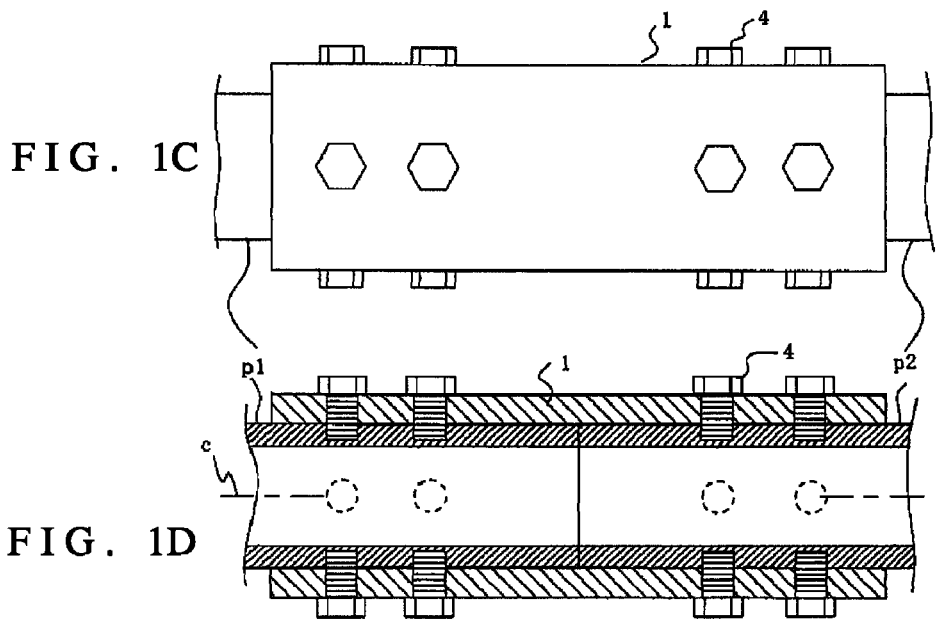
FIG. 1C
FIG. 1D

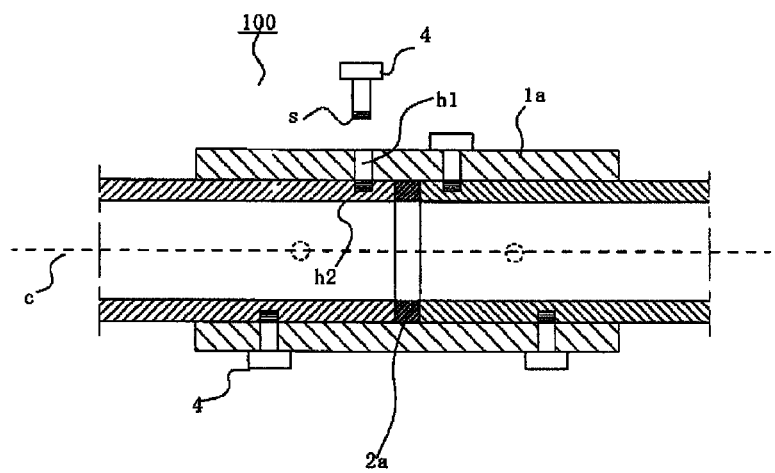
FIG. 4A
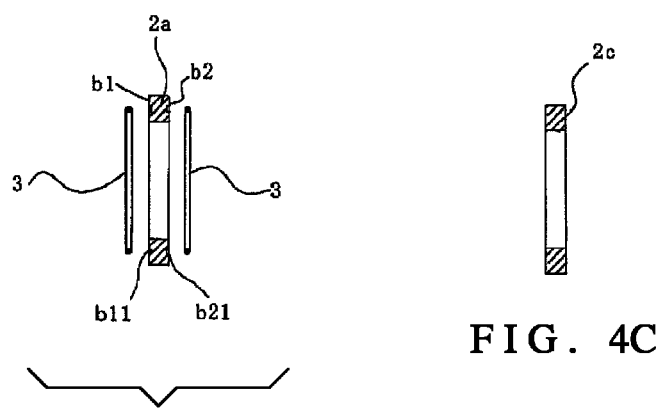
FIG. 4B
FIG. 4C

FIG. 10A
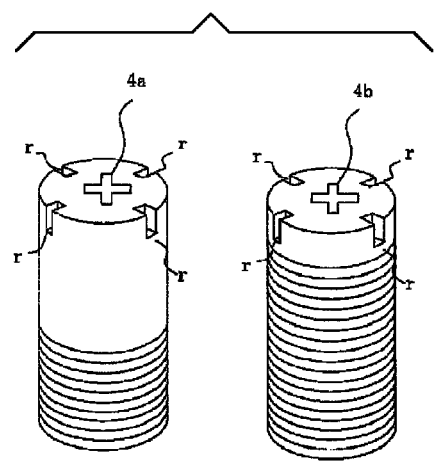
FIG. 10B
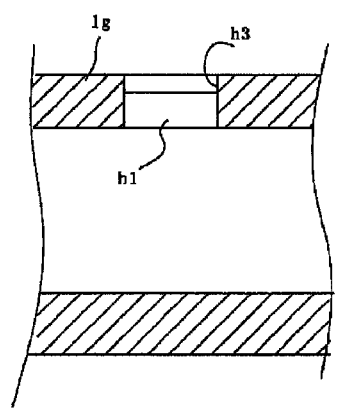
FIG. 10C
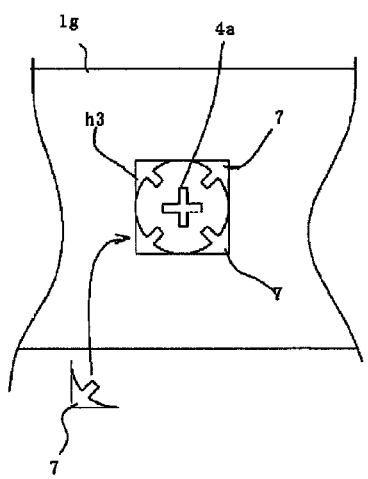
FIG. 10D

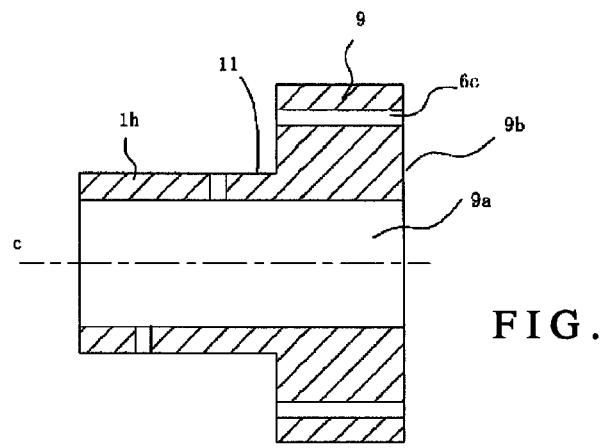
FIG. 11A
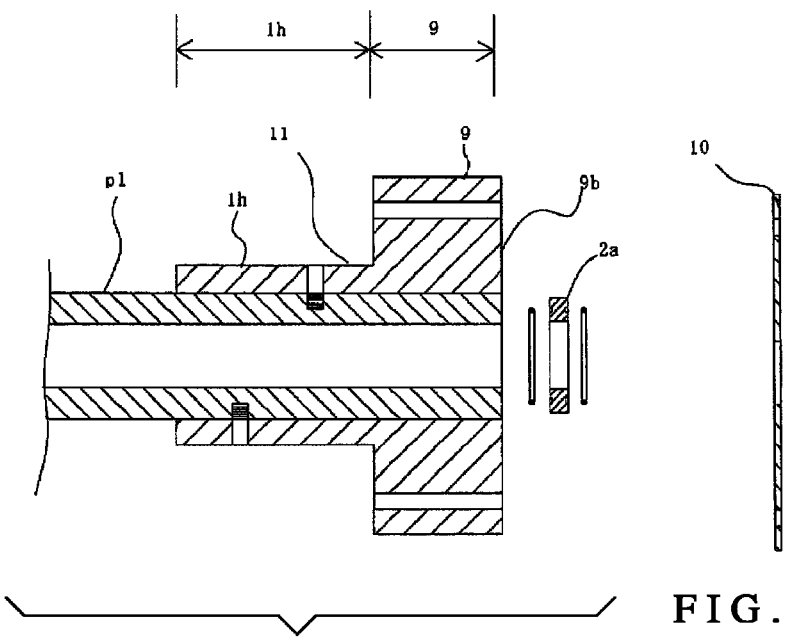
FIG. 11C
FIG. 11B

CONNECTING STRUCTURE FOR PRESSURE PIPING

CROSS-REFERENCE TO RELATED APPLICATION

The present application claims the priority under 35 U.S.C. 119 of Japanese Application No. 2011-004969, filed Jan. 13, 2011, which is hereby incorporated herein by reference in its entirety.

TECHNICAL FIELD

The present invention relates to a connecting structure for pressure piping for permitting connection of the pressure piping on-site without requiring welding.

BACKGROUND ART

In Japanese Industrial Standards, the strength of couplings that should be used is defined for connected pressure piping. In particular, concerning the strength of couplings, the strength that the base material of the pressure piping connected to the coupling must have before failure in a tension test is defined. In addition, with respect to a connection by welding, the pressure piping is required to extend a leg length for all over the place in order to keep weld strength that the base material of the pressure piping before failure in the same way. Such welding work requires skill, and therefore, the number of persons able to perform the work is limited.

Different connecting means than welding includes adhesive and bolts. For example, patent literatures 1 and 2 disclose means for combining pipe and pipe by bolts. These technologies are to fix pipes for accommodating electric wires with the fastening force of bolts screwed on peripheral surface walls of the pipes in their radial direction. These pipes are to protect the inner electric wires, and the electric wires in themselves do not either have pressure or leak. Patent literature 3 discloses a technique for connecting poles with the bolts, wherein the poles are fixed with the fastening force of the bolts.

RELATED ART DOCUMENTS

Patent Documents

Patent literature 1: Japanese Examined Utility Model Application Publication No. 51-9667
Patent literature 2: Japanese Unexamined Patent Application Publication No. 2003-180011
Patent literature 3: Japanese Unexamined Patent Application Publication No. 2010-180957

SUMMARY OF THE INVENTION

Object to be Solved by the Invention

In connecting pressure piping for transmitting high pressure fluid without using welding, it is necessary to keep a high tensile strength to seal in the internal fluid. In the above-mentioned bolt-connecting, it is predicted that the connecting strength is improved by enhancing the material strength of the bolts, bolt diameter, and/or fastening pressure. However, a problem about an arrangement to improve the strength or a means to seal a fluid flowing through the pressure piping has not been solved. The present invention aims to provide a connecting structure for pressure piping using bolts as a connecting means.

Means to Solve the Problem

The present invention is characterized by a connecting structure for connecting pressure piping to convey pressure fluid inside, including a cylindrical sleeve having a plurality of through holes at separate locations in a lengthwise direction, and with identical angular intervals in the circumferential direction and without overlapping in the circumferential direction, and a plurality of bolts to be inserted into the through holes of the sleeve. Non-through holes having screw threads are provided in the pressure piping at locations corresponding to the holes of the sleeve. When the pressure piping is inserted into the interior space of the sleeve, the non-through holes of the pipes open into the through holes of the sleeve, and the bolts are screwed into the communicating holes.

Effects of the Invention

According to pipe couplings of the present invention, it is possible to connect the pressure piping with the bolts without using welding in furnishing the pressure piping in which the tensile strength is required.

BRIEF DESCRIPTION OF THE DRAWINGS

FIGS. 1A, 1B, 1C and 1D illustrate a test sample of a connecting structure.
FIGS. 4A and 4B illustrate a connecting structure according to a first embodiment.
FIG. 4C illustrates an alternative form of insert.
FIGS. 10A, 10B, 10C and 10D illustrate a connecting structure using a detent according to a seventh embodiment.
FIGS. 11A, 11B and 11C illustrate a connecting structure according to an eighth embodiment.

MODE FOR CARRYING OUT THE INVENTION

Figure 2A:
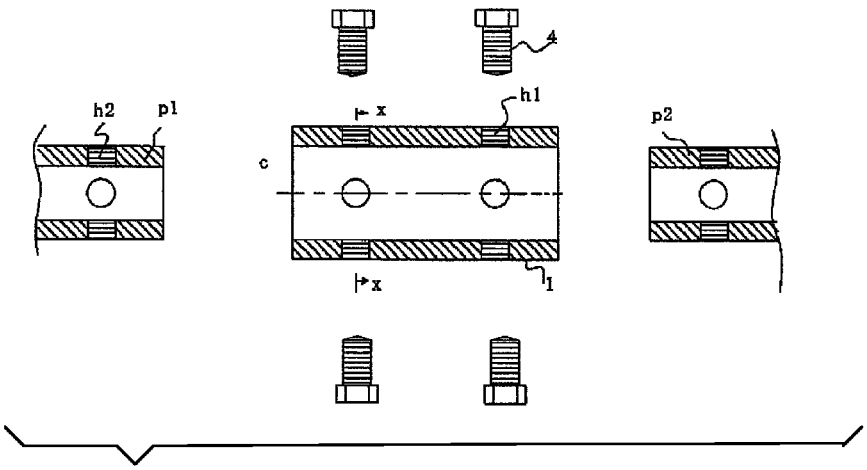
FIGS. 2A, 2B, 2C and 2D illustrate another test sample of a connecting structure.
Figure 2B:
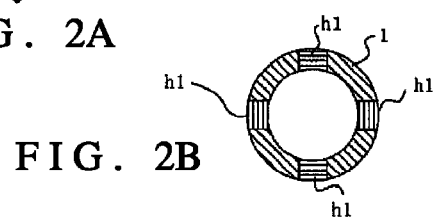
Figure 2C:
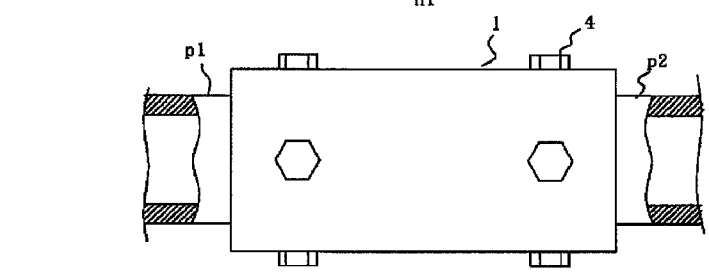
Figure 2D:
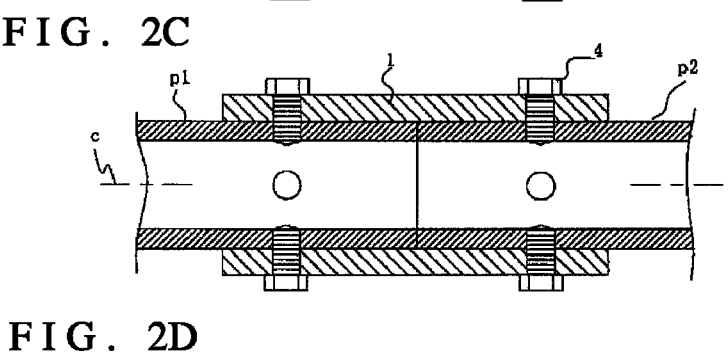

The tensile strength of a connecting structure for connecting pressure piping with bolts will be examined. In the above-mentioned patent documents, pipes are connected by transformation of the outer circumferential walls of the pipes, which is caused by the pressing force of screwed bolts. On the other hand, in a pressure piping equipment, the tensile strength for the pressure piping is set forth in the Japanese Industrial Standards, and to obtain enough connecting force, the bolts are inserted into holes provided on the pressure piping in addition to the transformation of the outer circumferential walls.

Besides, although the breaking strength of the pressure piping itself decreases because the holes are provided on the pressure piping, an object of the present embodiment is to obtain a connecting strength that is greater than the yield load of the pressure piping.

FIG. 1 is a view for explaining a sample used in a test. The sample according to FIG. 1 is so constructed that pressure pipes p1, p2 are inserted from both sides of a cylindrical sleeve 1 and screwed with four bolts extending through holes h1, h2 through the sleeve 1 at 90° intervals on the same circle, that is, along the same plane transverse to the longitudinal xis of the cylindrical sleeve, to connect the cylindrical sleeve to the pressure pipes p1, p2. FIG. 1B is a cross-sectional view of FIG. 2 taken along the line X-X, showing the situation in which the holes h1 are drilled through the sleeve 1 at 90 degree intervals. FIG. 1C shows the situation in which the bolts 4 are screwed into the holes, and FIG. 1D is a cross-sectional view of FIG. 1C.

Even when the bolts 4 are tightened, an inner wall of the sleeve 1 does not equally adhere on outer walls of the pressure pipes p1, p2. A reason is that the walls of the cylindrical sleeve 1 and the pipes p1, p2 one side of the connecting structure move away from each other when the walls of the cylindrical sleeve 1 in the pipes p1, p2 on the other side are closely adhered by tightening the bolts 4. Accordingly, in the case of the connecting structure like this sample, the tensile strength of the connecting structure depends not on the frictional force of the walls by tightening of the bolts 4, but wholly on the ability of the bolts to withstand the shearing force at a gap between the sleeve and the pressure pipes due to the tensile force imposed by the pipes on the connecting structure.

First, concerning the sample of FIG. 1, the relation between the tensile strength and cross-sectional area of the bolt 4 is examined by using eight bolts having a strength smaller than the strength of the pressure pipes p1, p2. The pressure pipes p1, p2 are made of STPT410 (carbon steel pipe for pressure service), sch160, 20A. Two kinds of bolts with a diameter of 2.5 mm or 4 mm were used. As a result, the bolt 4 broke during testing The breaking load in the case of a 2.5 mm bolt diameter was 20 KN, and the breaking load in the case of a 4 mm bolt diameter was 54 KN. The strength per unit cross-sectional area of the bolt 4 in the samples was 0.54 KN/mm$^2$ to 0.51 KN/mm$^2$, which are much the same. The tensile strength is calculated according to the cross-sectional area and the number of bolts 4.

Next, concerning the sample of FIG. 2, bolts 4 having a strength greater than the strength of the pressure pipes p1, p2 was used. The pressure pipes p1, p2 of this sample are made of STPG370 (carbon steel pipe for pressure service), sch80, 20A. The pressure pipes p1, p2, respectively, have a cross section of 285 mm$^2$, a tensile breaking load equal to or greater than 106 KN (105,450=370×285), and a yield load equal to or greater than the yield load of 62 KN. When four holes each having a diameter of 10 mm and a depth of 3.9 mm are used around the same circles, that is, along the same planes transverse to the longitudinal axis of the pressure pipes p1, p2, a decrease in the cross-sectional area of the pipes along the same circles of the pressure pipes p1, p2 becomes 156 mm$^2$ (10×3.9×4). The tensile breaking load of the base metal of the pressure pipes p1, p2 decreases from equal to or greater than 106 KN, which is in a state without a hole, to equal to or greater than 48 KN, because the cross-sectional area is decreased. Therefore, it is expected that the tensile breaking load of the base metal of the pressure pipes p1, p2 is below the yield load.

In a pulling test for this sample, the pressure pipes broke at a position along the circle on which bolt holes h1 are provided, at 78 KN. Therefore, it has been found that the pressure pipes of this case can withstand a tension bigger than the yield load. On the other hand, it is believed that the used pressure pipes made of STPG370 were stronger than the standardized strength of 370 N/mm$^2$ to begin with as a reason why the tension was bigger than the tensile breaking load calculated from the cross-sectional area of the pressure pipes p1, p2 of the sample of FIG. 2.

Figure 3A:
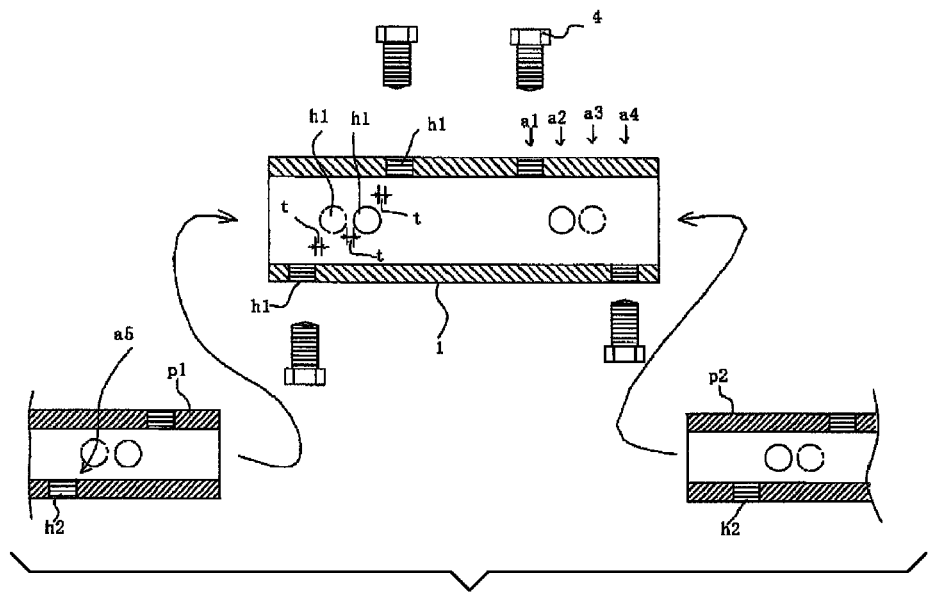
FIGS. 3A, 3B and 3C illustrate yet another test sample of a connecting structure.
Figure 3B:
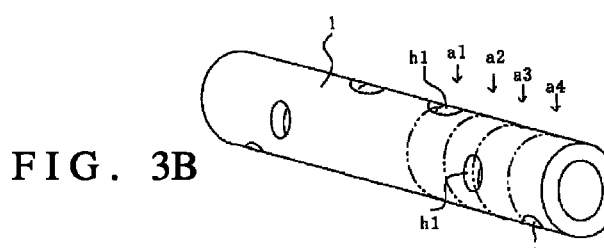
Figure 3C:
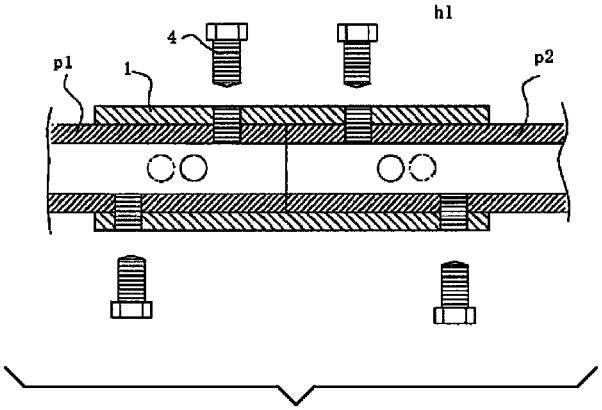

Furthermore, a sample of FIGS. 3A-3C is so formed that the pressure pipes are tightened with four bolts that are shifted in the length direction of the pressure pipes p1, p2 and by a 90 degrees angle on different circles, that is, different planes transverse to the length direction of the pressure pipes. In the sectional views, dashed-dotted lines show the holes that are formed on the cut pressure pipes. FIG. 3B is a perspective view of a sleeve 1, showing a situation in which bolt holes are provided on each of the circles a1, a2, a3 and a4, which are spaced from one another in the length direction of the pressure pipes. In the figures, chain double dashed lines show one of the circle passing through the center of each hole h1. In adjacent bolt holes, a shifting, or spacing, amount between the circles represents a distance between the closest outer diameters in a centerline c direction. In this sample, a shifting amount t is 2 mm. The shifting amount must be bigger than 0. FIG. 3C is a cross section showing a case where the bolts are screwed together. Each of the used bolts has a diameter of 10 mm and tensile strength of 1,000 N/mm$^2$.

In the case of this sample, the decrease in the cross-sectional area of the circles is 39 mm$^2$, which is equivalent to the dimensions of one lost hole. It is anticipated that the tensile breaking load of the base material of the pressure pipes p1, p2 on the circles a1, a2, a3 and a4 becomes equal to or greater than 92 KN, because the decrease in cross-sectional area reduces the strength. This value exceeds the yield load of 62 KN. On the other hand, when the sleeve 1 and the bolts have greater strength than the pressure pipes p1, p2, it is anticipated that a posterior position a5 of each of the holes h2 of the pressure pipes p1, p2 breaks due to the tension. When a tension test for each sample in FIGS. 3A-3C was performed, the pressure pipes broke at a load of 109 KN. A fracture surface continued obliquely from one hole to another. On the other hand, no breaks occurred at positions on the circles a1, a2, a3 and a4 of the pressure pipes p1, p2.

A pressure pipes of STPT410, sch160, 20A was tested for the sample shown in FIGS. 3A-3C in the same way. This pressure pipe has a cross-sectional area of 375 mm$^2$, a tensile breaking load equal to or greater than 154 KN, and a yield load equal to or greater than 92 KN. The expected tensile load of the base material of the pressure pipes p1, p2 at the positions of the circles a1, a2, a3 and a4 is 131 KN based on the cross-sectional area. The pressure pipe broke at a load of 134 KN in the test. A fracture surface obliquely continued from one hole to another, as in the previous test example. The bolt holes are arranged so as to be at equal angle intervals for all circles and not to overlap one another along a centerline direction. This is to equalize the shearing forces on the bolts.

The tests reveal that the cross-sectional area of the pressure pipes lost by the bolts can be reduced and yet the strength can be maintained by raising the tensile breaking load per unit area of the bolt. Here, because the shearing strength is expected to be 60% of the tensile strength, the strength of the bolt is 1.67 times (1/0.6) the tensile strength of the pressure pipe to be used. Therefore, it is desirable to use a bolt with strength equal to this.

Furthermore, although a sample in which adhesive was applied between the pressure pipes and the sleeve of FIGS. 3A-3C was, no improvement in the tensile strength was seen. however, it is expected that the use of the adhesive improves the sealing performance of the pressure pipes for air.

Moreover, the material of the sleeve has a tensile strength that is the same as, or greater than, the connected pressure pipes. Otherwise, a sleeve having a cross-sectional area that provides it with a tensile breaking load bigger than the tensile breaking load of the pressure pipes is used.

Thus, when the pressure pipes were connected with bolts, it was found that a tensile breaking load equal to or greater than the yield strength of the pressure pipes was shown without a break at least on the circles a1 to a4 of the pressure pipes having their cross-sectional area reduced by the bolts, due to proper control of the tensile shearing load, and the number and dispositions of the bolts.

Specifically, the bolts are arranged on the different circles, and the number of bolts and the strength of a bolt unit area can be determined for the yield strength of the pressure pipes and g as follows.

$$F<(S-L)\times N1 = n\times(r/2)2\times\pi\times N2\times 0.6 \qquad \text{Expression 1}$$

In Expression 1, N1 is the tensile breaking strength of a pressure pipe per unit area; N2 is the tensile breaking strength of a bolt per unit area; r is the diameter of a bolt; S is the cross-sectional area of a pipe; n is the number of bolts; F is the yield load of a pressure pipe; L is the cross-sectional area lost due to a bolt hole on the same circle; and 0.6 is a correction factor for the strength of a bolt due to shearing force.

When there is a plurality of bolt holes on the same circle, the cross-sectional area L becomes the total cross-sectional area lost due to the bolts. Further, the cross-sectional area L becomes the cross-sectional area of the circle that is most greatly lost in case the cross-sectional area to be lost differs among the circles. The bolt hole may be provided to one place on the same circle because the strength of the pressure pipe is lost when a plurality of bolt holes are present on the same circle. Accordingly, it is possible to avoid breaks on the circles a1 to a4 and fracture of the bolts themselves when the cross-sectional area of the pressure pipe is reduced.

The following construction is used as a connecting structure of pipes for conveying a pressure fluid inside.

The bolt holes do not penetrate the pressure pipes because inner fluid leaks outside through the bolt holes. In addition, sealing is performed at a position of an end face of the pressure pipes to limit the area with which the inner fluid comes in contact. Moreover, an O-ring is used, and a groove for the O-ring is provided, not on the end face of the pressure pipe but on an insert side, because the pressure pipe is often cut for length adjustment at a piping site, and it is difficult to notch the O-ring groove within the wall thickness of the pressure piping at the site. Hereinafter, concrete examples for connecting pressure pipes piping using a connection strength to be provided by a bolt will be explained with reference to the figures.

EXAMPLE 1

A connecting structure 100 related to a first example is illustrated in FIG. 4. The connecting structure 100 includes a sleeve 1a, an insert 2a, O-rings 3 and a plurality of bolts 4.

The sleeve 1a is a linear cylindrical pipe, and the insert 2a is inserted in an inner circumferential face side of the linear cylindrical pipe.

The insert 2a has annular faces b1, b2 in a centerline c direction of the sleeve 1a, and annular ring grooves b11, b21 are provided in the annular faces b1, b2, respectively. An O-ring 3 is put in each of the ring grooves b11, b21. The bolts 4 are tightened on different circles spaced in the centerline c direction, with each bolt 4 shifted 90 degrees from an adjacent bolt 4, as is the case with the connecting structure in FIG. 3. Holes h2 do not penetrate the pressure piping p1, p2 to prevent the inner fluid from leaking outside along a screw thread. The hole h1 of the sleeve 1a has no screw thread, but only the hole h2 has a screw thread. In accordance with this, the bolt 4 has a screw thread only at a position s that is to be screwed in the hole h2, but no screw thread between the position s and a head of the bolt 4. This is to improve the strength of the bolt. In place of the insert 2a, various sealants can be used as an insert depending on the fluid flowing in the pressure pipes p1, p2 (liquid, gas, low pressure, high pressure). For example, a gasket, packing and so on (FIG. 4C, 2c) can be used as a sealant to keep the connection airtight and watertight.

Referring now to a point to connect two pressure pipes p1, p2 having the connecting structure 100.

Ends of the pressure pipes p1, p2 are pushed into the sleeve 1a to the insert 2a from both sides and pressed toward each other to compress the O-ring 3 of the insert 2a. The compressed pressure is equivalent to prestress in using the O-ring 3.

Under this condition, the pressure pipes p1, p2 are marked in accordance with the position of a necessary plurality of holes h1. Then, the pressure pipes p1, p2 are removed from the sleeve 1a, and holes h2 are provided in the marked position. The depth of the hole h2 is not beyond the wall thickness of the pressure pipes p1, p2. A screw thread is provided in the holes h2.

Next, the pressure pipes p1, p2 are pushed into the sleeve 1a across from one another at the insert 2a and pressed by a pressure equivalent to the prestress of the O-ring 3 to return each of the pressure pipes p1, p2 and the sleeve 1a to the relative positions that had previously, positions corresponding to the positions for which the hole h2 was marked. Thereafter, the bolts 4 through the holes h1 of the sleeve 1a are screwed into the holes 2a and tightened, respectively. If a screw thread is simultaneously made in the holes h1, h2 when the pressure is applied from both sides on the pressure pipes p1, p2, the screw hole h2 can be made without marking, and screw threading bolts can be tightened in the holes h1, h2.

In addition, if the ring grooves b11, b21 have a depth just adapted for putting appropriate sealing pressure on the O-ring 3, appropriate pressure is naturally put on the O-ring 3 by pushing the pressure pipe p1 or p2 into the sleeve 1a or 1b until the end face of the pressure pipe p1 or p2 contacts the annular face b1 or b2 of the insert 2a. If the depths of the ring grooves b11, b21 are decided in advance in this way, the locations of the holes h2 can be identified and processed without marking, because it is known beforehand where along the pressure pipes p1, p2 the holes h1 of the sleeve 1a or 1b are located when the pipes p1, p2 are pushed to their limits.

According to this, the pressure pipe p1 is connected to the pressure pipe p2 in the state that the appropriate prestress is imposed on the O-ring 3. An adhesive can be used for the face of either the outer circumference area of the pressure pipes p1, p2 or the inner circumferential face of the sleeve 1a before again pushing the pressure pipes p1, p2 into the sleeve 1a after forming the hole h2. By using the adhesive, the fluid tightness is improved. The O-rings 3 are positioned at the end faces of the pressure pipes p1, p2 because the insert 2a is restricted from moving in the pipe by an inner wall of the sleeve 1a. The areas of the perforated holes h2 of the pressure pipes p1, p2 are quenched by carburizing or induction quenching to increase the tensile strength for those areas, and to increase the tensile breaking load that was decreased by the forming of the perforated holes h2 in the pressure pipes p1, p2.

In the first example, the pressure pipes p1, p2 and the sleeve 1a are made with steel materials, but use other metal materials.

EXAMPLE 2

Figure 5:
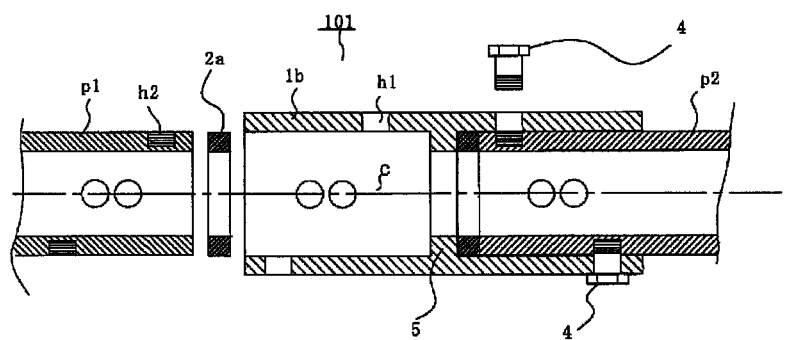
FIG. 5 illustrates a connecting structure according to a second embodiment.

FIG. 5 shows a connecting structure 101 related to a second example. In the connecting structure 101, an annular neck portion 5 projects from the inner circumference of the sleeve 1b at the center of the sleeve 1b, in a lengthwise direction of the sleeve 1b. Both side faces of the neck portion 5 are perpendicular to a centerline c, having the same radial dimension as the thickness of the pressure pipes p1, p2. In addition, the inner circumferential face of the neck portion 5 is a curved surface having the same diameter as the inner circumference of the pressure pipes p1, p2.

Inserts 2a are respectively inserted from both ends of the sleeve 1b with the O-rings 3, and each comes into contact with the neck portion 5. Even if all of the bolts 4 break, the sleeve 1b can be restricted from slipping on the pressure pipes p1, p2 and falling away from the contact portion because the neck portion 5 is provided.

Reference is made to a combination procedure for two pressure pipes p1, p2 according to the connecting structure 101. The insert 2a is inserted from the sleeve 1b, and then, the two pressure pipes p1, p2 are pushed into the sleeve 1b from both sides, and then, a pressing force is imposed on the pressure pipes p1, p2. The pressing force is equivalent to the prestress that the O-ring 3 mounted on the insert 2a has in a use state.

Under this state, as in the case of the first example, the pressure pipes p1, p2 are marked at positions corresponding to the positions of the holes h1, and thereafter, each of the pressure pipes p1, p2 is pulled out of the sleeve 1b, the holes h2 are formed, and the screw thread is formed.

The inserts 2a are respectively inserted from opposite ends of the sleeve 1b, and the end portions of the pressure pipes p1, p2 are pushed therein and tightened by screwing with bolts 4 while a pressing force corresponding to the prestress of the O-ring 3 is applied. In addition, an adhesive can be used between the pressure pipes p1, p2 and the sleeve 1a together with the bolts.

Just as in the earlier example, if the depth of the ring grooves b11, b21 of the insert 2a is made to such a depth that the O-ring 3 is fit for the ring grooves b11, b 21 when appropriate sealing pressure is applied thereon, the positions of the holes h2 can be specified and processed without marking.

EXAMPLE 3

Figure 6:
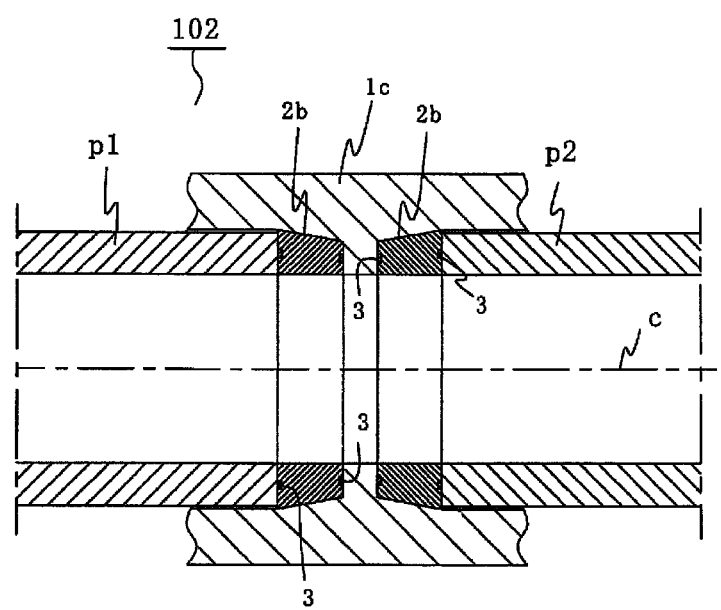
FIG. 6 illustrates a connecting structure according to a third embodiment.

FIG. 6 shows a connecting structure 102 having a sleeve 1c deformed relative to the sleeve 1b of the second example and an insert 2b. The area surrounding the neck portion 5 is deformed, and it is expanded and shown in the figure. In FIG. 6, each of the outer circumferential faces of a pair of inserts 2b is formed into a conical male taper face whose diameter decreases in a direction toward the neck portion 5, and each of a part of the inner circumferential faces of the sleeve 1c is also formed in a conical male taper face whose diameter decreases in a direction toward the neck portion 5.

According to this example, when each of the inserts 2b is pushed toward the neck portion 5, the sleeve 1c and the pressure pipes p1, p2 become concentrically positioned by the conical male taper face.

EXAMPLE 4

Figure 7A:
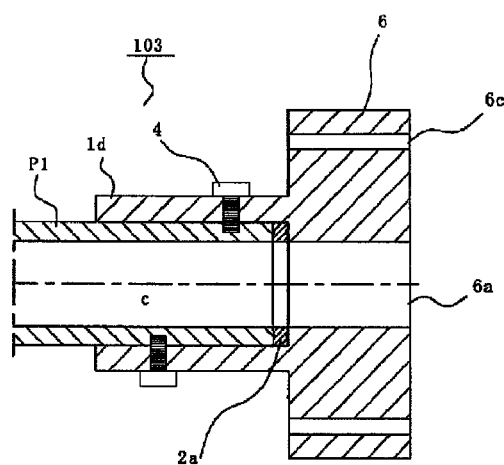
FIGS. 7A and 7B illustrate a connecting structure according to a fourth embodiment.
Figure 7B:
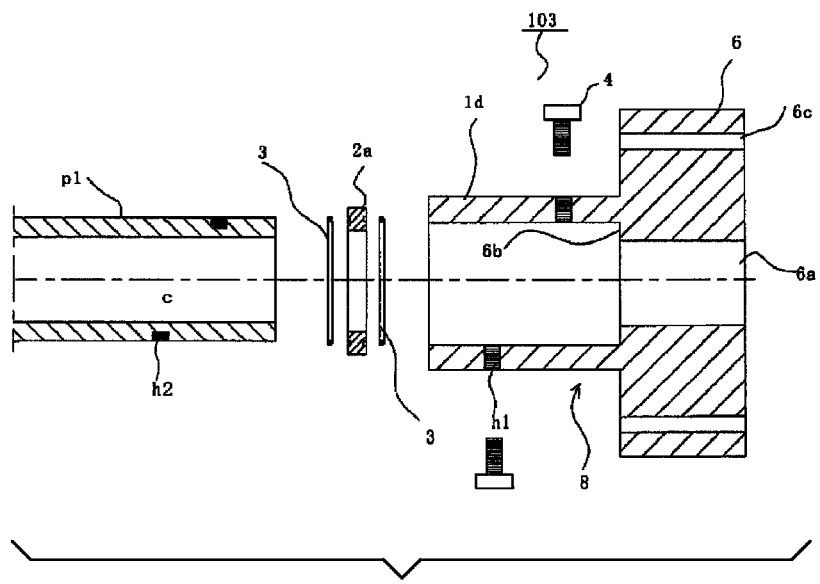

EXAMPLE 4 is explained with reference to FIG. 7. A connecting structure 103 of this example comprises a sleeve portion 1d, a flange portion 6, an insert 2a, O-rings 3 and bolts 4. In FIG. 7, generally the same reference characters are used as in EXAMPLE 2.

The sleeve portion 1d and the flange portion 6 form a flange coupling 8 as a unified part. The flange portion 6 has an inner hole 6a concentric with a hollow inside the sleeve portion 1d as a fluid channel, besides having an annular face 6b perpendicular to the centerline c between the inner hole 6a and the sleeve portion 1d. Multiple bolt holes 6c are formed in an outer circumference portion of the flange portion 6 to insert bolts for connecting the flange portion 6 to a like flange coupling. The insert 2a is inserted into the inner circumferential face of the sleeve portion 1d. Here, multiple holes h1 pass through the sleeve portion 1d.

The order for connecting the pressure pipe p1 according to the connecting structure 103 is the same as the order for connecting a pressure pipe at one side in EXAMPLE 2. The pressure pipe p1 may be connected to the sleeve portion 1d by using the annular face 6b, just as the pipe p1 is connected to the sleeve portion 1b by using one of the sides of the neck portion 5 in EXAMPLE 2 (FIG. 5).

The thus connected pressure pipe p1 with the flange portion 6 for example, bolts inserted into the bolt holes 6c and nuts, and packing screwed on the bolts.

EXAMPLE 5

A connecting structure of EXAMPLE 5 may be so constructed that a female taper face having a diameter that decreases in a direction toward the annular face 6b is formed on the inner circumferential face of the sleeve portion 1d of EXAMPLE 4 and the insert 2b of EXAMPLE 3. In this case, it is easy to locate the insert 2a, as i the t is in EXAMPLE 3.

EXAMPLE 6

Figure 8:
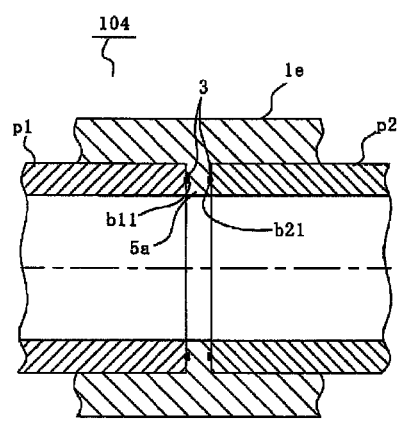
FIG. 8 illustrates a connecting structure according to a fifth embodiment.

EXAMPLE 6 is explained with reference to FIG. 8. In a connecting structure 104 related to this example, a neck portion 5a of a sleeve 1e has annular ring-grooves b11, b21 formed concentrically on the sides, respectively, unlike the neck portion 5 of the sleeve 1b of EXAMPLE 2. Each of the ring-grooves b11, b21 receives an O-ring 3.

This structure is comparable to the neck portion 5 in EXAMPLE 2 with respect to the sealing function of the insert 2a. In this example, it is not easy to install the O-rings 3 in the ring-grooves b11, b21 formed in the inner part of the sleeve 1e, but the number of parts can be reduced because the insert 2a is not used.

EXAMPLE 7

Figure 9:
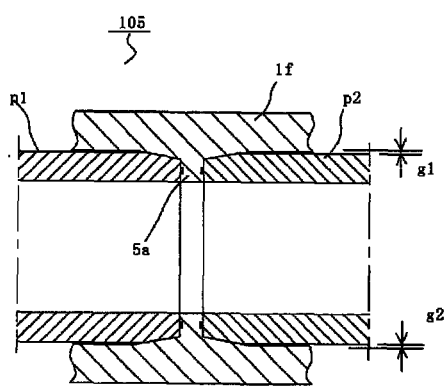
FIG. 9 illustrates a connecting structure according to a sixth embodiment.

The connecting structure 103 referred to EXAMPLE 4 can be transformed to a connecting structure 105 as shown in FIG. 9. In the connecting structure 105, the tips of the outer circumferential faces of the pressure pipes p1, p2 are respectively formed into tapering male faces. And the inner circumferential face of the sleeve if is formed into a female tapering face toward the inner part.

Accordingly, even if there are radial gaps g1, g2 between the inner circumferential face of the sleeve if and the inserted pressure pipes p1, p2, they are automatically made concentric by the guiding of the male and female tapering faces.

EXAMPLE 8

FIG. 10 shows EXAMPLE 8. This is an example wherein the sleeve and the bolt are respectively modified. A bolt 4a is a Phillips-screw, which has a screw thread on portion corresponding to the hole h2 and notches r located at four portions positioned diagonally with respect to one another on the head. A bolt 4b has a screw thread on the portion corresponding to the holes h1, h2. On the other hand, the hole h1 of the sleeve 1g has a square hollow h3 on the outer circumferential side of the sleeve 1g. FIG. 10B shows a detent 7. The detent 7 has place surfaces corresponding to a spatial configuration that is formed between the square hollow and the circular bolt-head. A convex portion 7a of the detent 7 is inserted into a notch r of the head of the bolt 4b. The bolt 4a is prevented from rotating by fitting the detents 7 into the four spaces between the hollow h3 and the head of the bolt 4a. The detent 7 may be made out of stainless steel.

EXAMPLE 9

FIG. 11 shows EXAMPLE 9. This example refers to a flange coupling 11, which is the same as having changed a part of the flange coupling 8 in the connecting structure 103 of EXAMPLE 4, and generally the reference characters of EXAMPLE 4 are used in EXAMPLE 9.

A sleeve 1h and a flange portion 9 form a unified part. The flange portion 9 has an inner hole 9a as a fluid channel. The flange coupling 11 differs from the flange coupling 8 of EXAMPLE 4 in that the flange portion 6 and the sleeve portion 1d are continuously connected without a perpendicular annular face 6b (FIG. 7) therebetween. Therefore, the pressure pipe p1 has an end face that reaches an end face 9b of the flange portion 9 through a hollow of the flange coupling 11. The end portion of the pressure piping p1 can either pass through the flange coupling 11 and protrude from the end face 9b or stop short before the end face 9b. The multiple bolt holes 6c for inserting the bolts are formed on an outer circumferential portion of the flange portion 6. As shown in FIG. 11B, in the case of connecting to another flange coupling after connecting to the pressure pipe p1, the insert 2a and the packing 10 (FIG. 11) are supplied on the end face of the pressure pipe p1 or both the end face of the pressure pipe p1 and the end face 9b of the flange portion 9. Here, the end face of the pressure pipe p1 is exposed, and therefore, seals such as the insert 2a and the packing 10 can be immediately dropped out when removing the flange coupling 11 from the other coupling.

EXAMPLE 10

Figure 12:
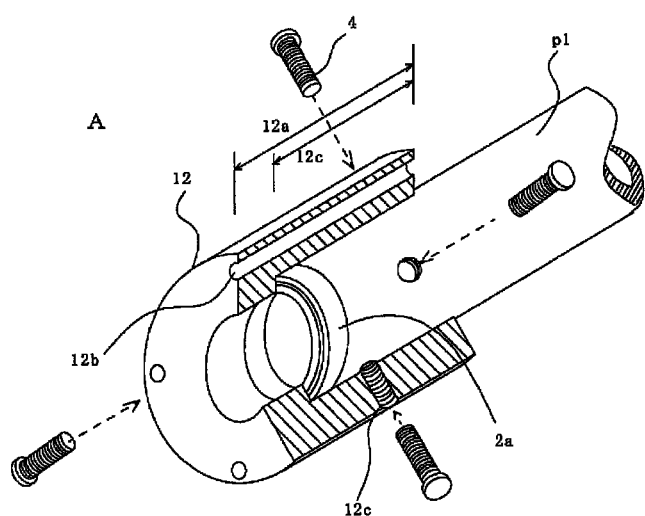
FIG. 12 illustrates a connecting structure according to a ninth embodiment.

FIG. 12 shows EXAMPLE 10. This example refers to a flange coupling 12, which is the same as having changed a part of flange coupling 8 in the connecting structure 103 of EXAMPLE 4, and generally the same reference characters are used in EXAMPLE 10 and EXAMPLE 4. A flange portion 12a, which has a bolt hole 12b for connecting with the other flange coupling, overlaps with a sleeve portion 12c. The hole h1 provided in the sleeve portion 12c and the bolt hole 12b are shifted relative to one another so as not to interfere with one another. The flange coupling 12 can be considered to have the outer circumferential face of the flange portion 6 of EXAMPLE 4 just continued to the sleeve portion 1d (FIG. 7).

EXAMPLE 11

Figure 13:
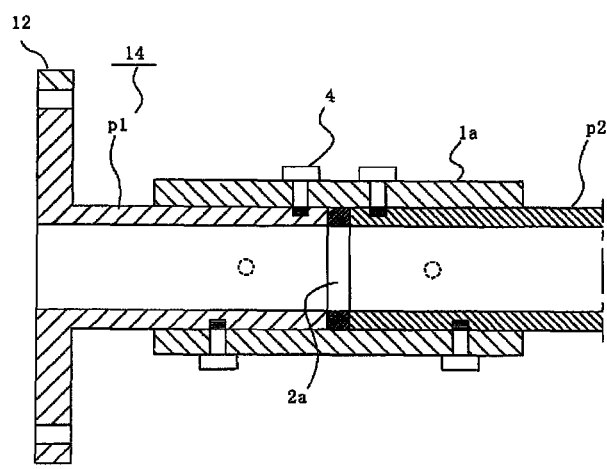
FIG. 13 illustrates a connecting structure according to a tenth embodiment.

FIG. 13 shows EXAMPLE 11. This example refers to a flange coupling 14 having a flange portion on the pressure pipe p1 of EXAMPLE 1. A connection with the pressure pipe p2 conforms to EXAMPLE 1.

EXAMPLE 12

Figure 14:
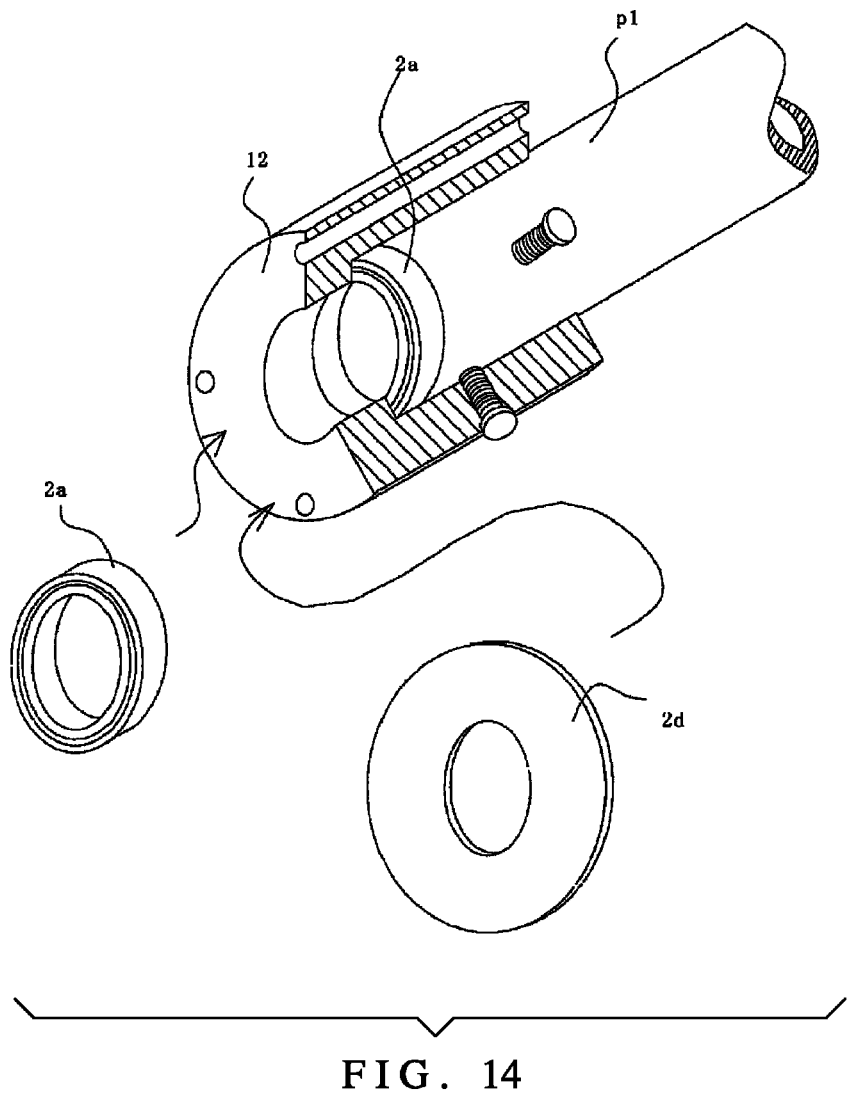
FIG. 14 illustrates a connecting structure according to an eleventh embodiment.

In FIG. 14, an insert 2a or a sheet packing 2d can be used with the flange coupling 12 in EXAMPLE 12 in order to connect to the other flange coupling.

EXAMPLE 13

Figures 15A, 15B:
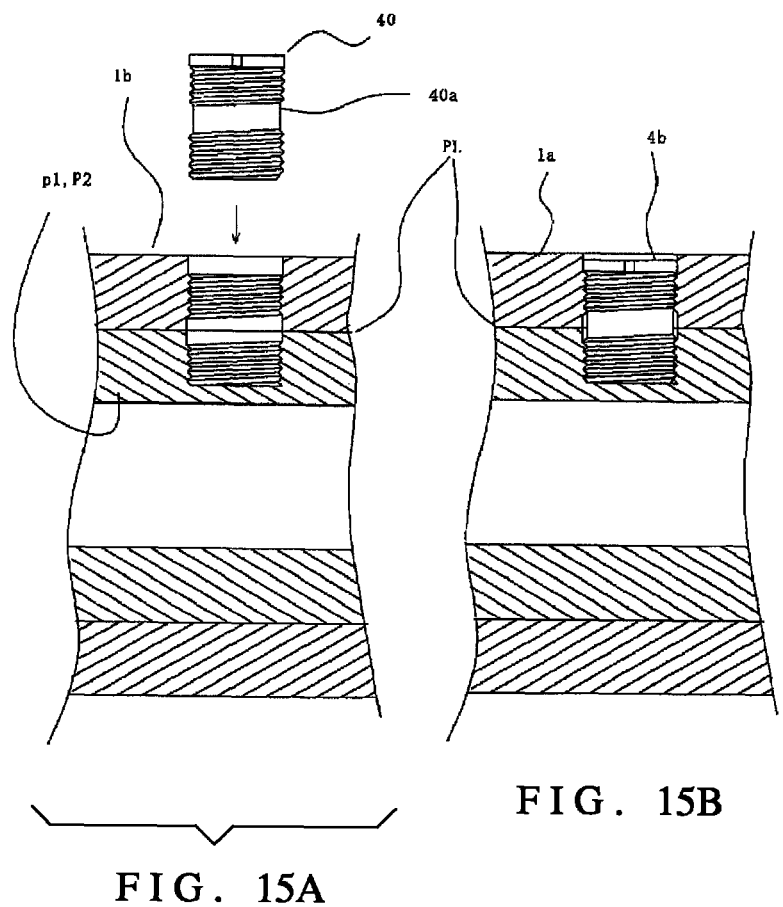
FIGS. 15A and 15B illustrate a connecting structure according to a twelfth embodiment.

The bolt 4 connecting the pressure pipes p1, p2 to the sleeve bears shear force at the contact surface between the sleeve and the pressure pipe. FIG. 15 shows a bolt 40 whose sheer strength is great. A shank portion 40a of the bolt 40, which is located in the contact surface PL, forms a straight curved surface without a screw thread.

EXAMPLE 14

Figure 16:
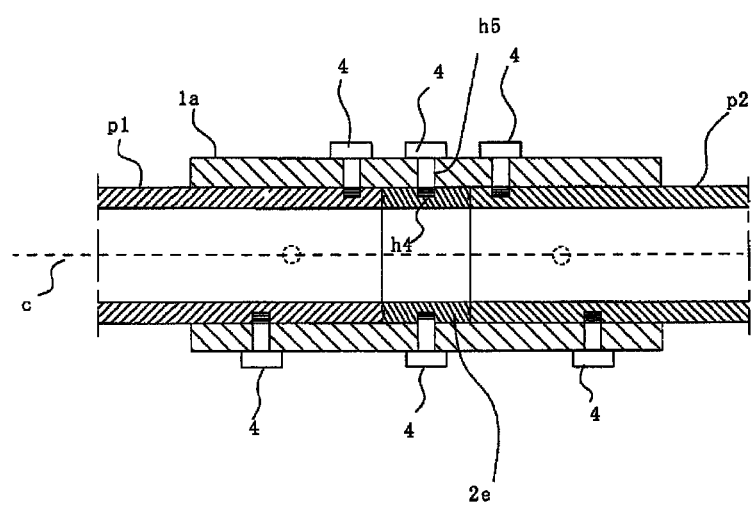
FIG. 16 illustrates a connecting structure according to a thirteenth embodiment.

In addition, the connecting structure may be constructed so that an insert can be connected to the sleeve with bolts. In FIG. 16, an insert 2e is formed into a pipe having the same inside diameter as the pressure pipes p1, p2, and blind threaded holes h4 on its outer surface. The sleeve 1a has through holes h5 at positions corresponding to the threaded holes h4 (which can have screw threads), and the insert 2e is connected to the sleeve 1a with the bolts 4.

In this structure, when removing the pressure pipe p2, all bolts 4 are removed, and the end of the pressure pipe p2 is exposed by sliding the sleeve 1a to the left. Therefore, the pressure pipe p2 can be removed without changing the positional relationship of the pressure pipe p1 installed in the spot.

EXAMPLE 15

Figure 17A:
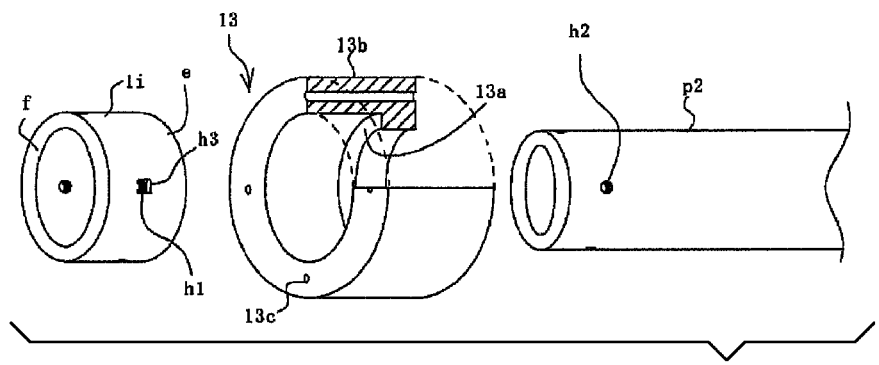
FIGS. 17A, 17B and 17C illustrate a connecting structure according to a fourteenth embodiment.
Figure 17B:
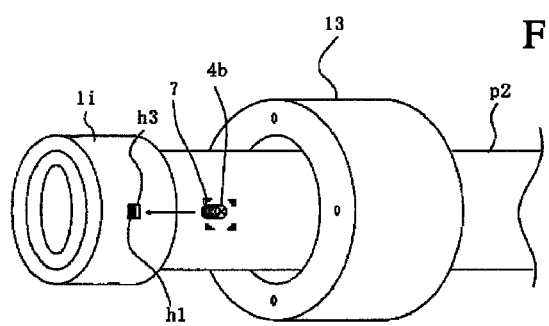
Figure 17C:
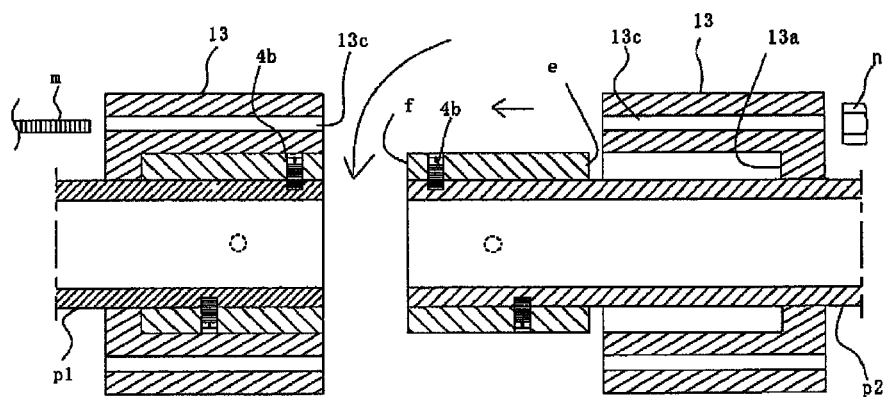

FIG. 17 shows the other example for connecting pressure piping with a loose coupling. In FIG. 17C, a cylindrical sleeve 1i has multiple through holes h1 provided at separate locations in the lengthwise direction, and at equiangular intervals with respect to one another and without overlapping in the circumferential direction, as is also true of the sleeve 1*a* and so on of the former examples. However, the sleeve 1*i* extends to the end of the pressure piping p2. On the other hand, a loose coupling 13 is used to connect the pressure pipe p2 with another pipe. The loose coupling 13 has a flange portion 13*a* contacting one end e of the sleeve 1*i*, a body portion 13*b* extending to the other end f of the sleeve 1*i* at the outer surface of the sleeve 1*i*, and bolt holes 13*c* for connecting the loose coupling 13 with another loose coupling. In the present invention, although the body portion 13*b* has a length extending to the other end f of the sleeve 1*i*, it does not have to extend thereto.

During ass connecting structure embly of the, the pressure pipe p2 is put through the loose coupling 13 as shown in FIG. 17A, and then, the sleeve 1*i* is secured on the pressure piping p2 with bolts 4 as shown in FIG. 17B (in the figure, the bolts 4*b* are shown). As for the bolts 4, a bolt whose head does not protrude from the outer surface of the sleeve 1*i* is used. The bolts 4*b* may be used with the detents 7 of FIG. 10B. The pressure pipe p2 has non-through threaded holes h2 at locations corresponding to the holes h1, as in the former example. Likewise, the sleeve 1*i* is fixed on the pressure pipe p1 with the bolts 4*b*, and the couplings are fixed with a bolt m and a nut n. Various inserts for sealing as shown with arrows in FIG. 17C (such as a gasket, a packing, an O-ring and so on) are put between the pressure pipe p1 and the pressure pipe p2. The end surface of the pressure pipe p2 (or the pressure pipe p1) may act as a sealing face on which a seal is located, and therefore, the seal may be located on the end surface of the sleeve 1*i* or the loose coupling, or not. The partner coupling connecting with the loose coupling may be a flange coupling such as that of FIG. 7 or FIG. 12, or another form.

EXAMPLE 16

Figure 18A:
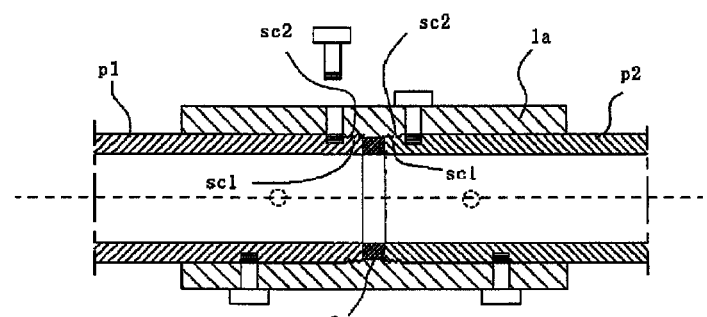
FIGS. 18A, 18B and 18C illustrate a connecting structure according to a fifteenth sixteenth embodiment.
Figure 18B:
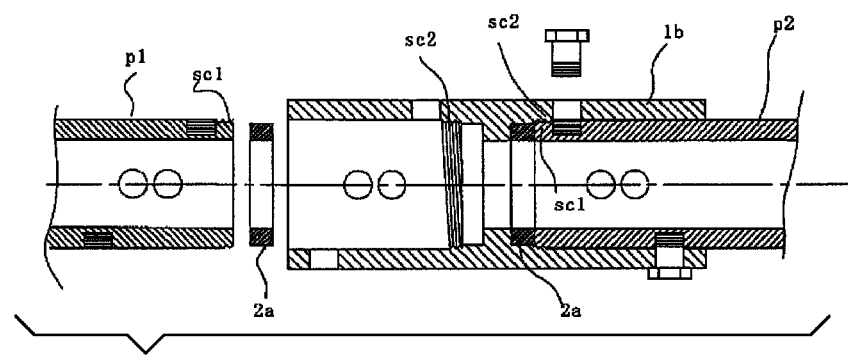
Figure 18C:
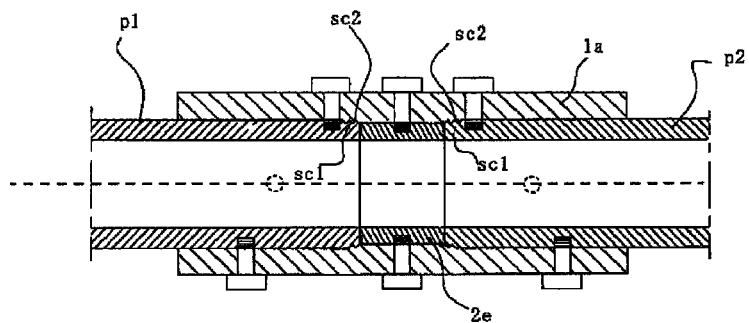

FIG. 18 shows an example, in which specified prestress is given to the insert 2*a* for sealing by screwing the pressure pipe p1 (or p2) in the sleeves 1*a*, 1*b*. FIG. 18A shows an embodiment of FIG. 4A (EXAMPLE 1); FIG. 18B shows an embodiment of FIG. 5A (EXAMPLE 2); and FIG. 18C shows an embodiment of FIG. 16 (EXAMPLE 16), each as an example, respectively. Screw threads sc1 are provided on the outer circumference of the pressure pipe p1, p2, respectively, and screw threads sc2 for cooperating with the screw threads sc1 are provided on the inner circumference of the sleeves 1*a*, 1*b*, respectively. The inserts 2*a*, 2*e* have pressure applied to them by screwing the pressure pipe p1 or the pressure pipe p2 into the sleeve 1*a* or the sleeve 1*b*.

The prestress on the sealing material of the inserts 2*a*, 2*e* can be determined by adjusting the screwed length. The present invention can be applied to the case in which the sleeve portions ld, 12*c* of the flange portions disclosed in the embodiments of FIG. 7 (EXAMPLE 4) and the embodiment of FIG. 12 (EXAMPLE 10) are connected with the pressure pipe p1 through the insert 2*a*.

If the insert 2*a* has the ring grooves b11, b21 with a depth to fit the O-ring when proper sealing pressure is applied thereto, proper pressure comes to be spontaneously added on the O-ring by screwing the pressure pipe p1 or the pressure pipe p2 into the sleeve 1*a* or the sleeve 1*b* until the end face thereof contacts the annular faces b1, b2 of the insert 2*a*.

EXAMPLE 17

Figure 19:
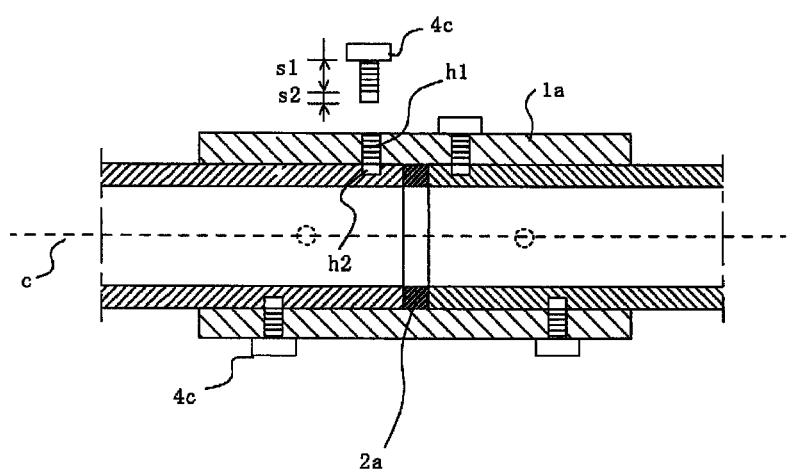
FIG. 19 illustrates a connecting structure according to a sixteenth embodiment.

In EXAMPLE 8 shown in FIG. 10, the bolt 4*a* has the screw thread on only a portion corresponding to the hole h2, but the portion may be formed columnar and the screw thread may be provided on only a portion corresponding to the hole h1. In FIG. 19, a bolt 4*c* has a screw thread on a portion s1 corresponding to the hole h1, and a portion s2 corresponding to the hole h2 is columnar, without a screw thread. The pressure pipes p1, p2 have no screw threads on the holes h2, and each hole h2 is a cylindrical non-through hole for inserting the columnar portion s2 of the bolt 4*c*. On the other hand, the sleeve 1*a* is the same as the sleeve shown in FIG. 4. Further, the pressure pipes p1, p2 have the insert 2*a* shown in the embodiment of FIG. 4 inserted therebetween. The O-ring 3 in the insert 2*a* can seal with necessary proper pressure by inserting the portion s2 of the bolt 4*c* into the hole h2 after locating the insert between the pressure pipe p1 and the pressure pipe p2 under compression. According to the present embodiment, the hole h2 has an inner surface formed as a smooth column curved surface, and therefore, the pressure pipe has high strength. The features shown above can be applied to all EXAMPLES 1 to 16.

EXAMPLE 18

Figure 20A:
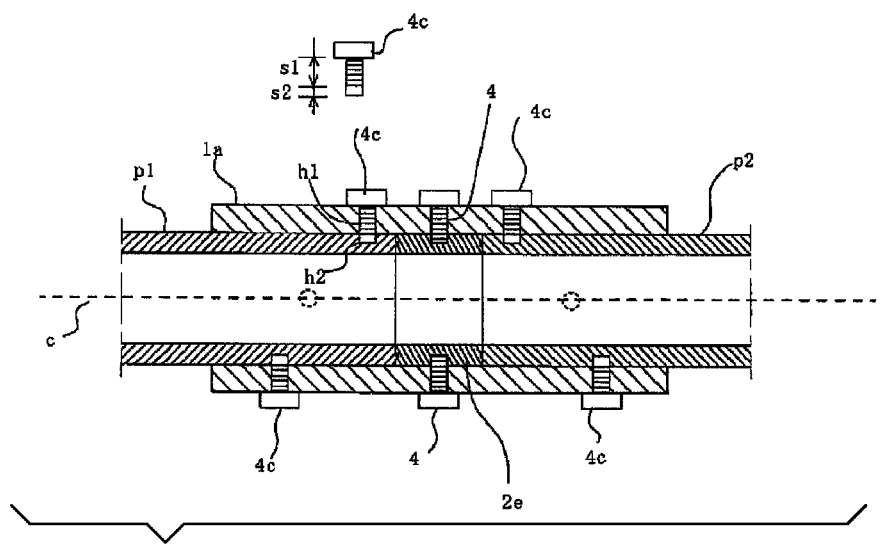
FIGS. 20A, 20B and 20C illustrate connecting structures structure according to seventeenth and eighteenth embodiments.

FIG. 20A shows an example for using the bolts 4*c* of FIG. 19 and connecting the pressure pipes p1, p2 through the insert 2*e* (FIG. 16). In the present example, the insert 2*e* is fixed on the sleeve 1*a*, and thereafter, the portion s2 of the bolt 4*c* is inserted into the hole h2 in the situation where the O-rings on left and right sides of insert 2*e* are compressed with proper pressure by respectively pushing the pressure pipes p1, p2 into the sleeve 1*a*.

EXAMPLE 19

Figure 20B:
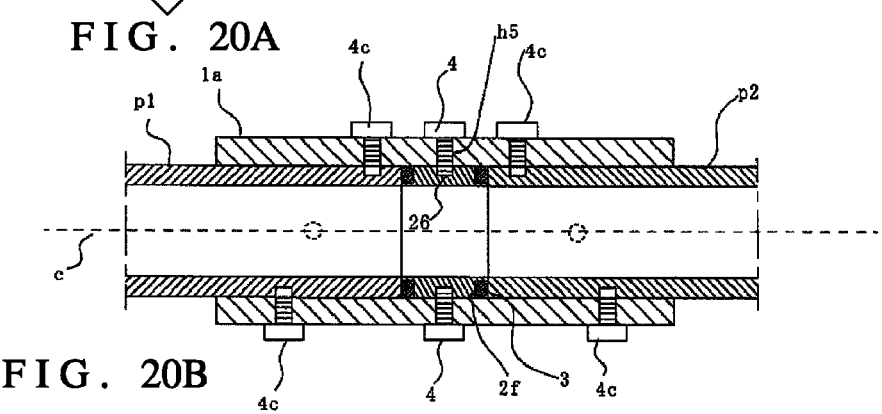
Figure 20C:
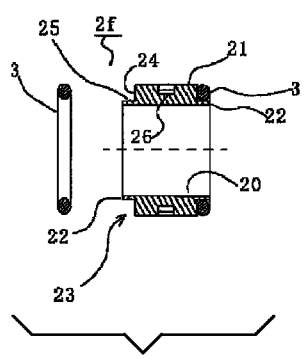

FIG. 20C shows an insert 2*f* reformed for a thick O-ring.
FIG. 20B shows the situation in which the pressure pipes p1, p2 are connected through the inset 2*f*.

The insert 2*f* is a form of ring; its inner circumferential surface 20 has a diameter that is the same as the internal circumferential surface of the pressure pipes p1; and its outer circumferential surface 21 has a diameter slightly smaller than the outer circumferential surface of the sleeve 1*a*. There are step-shaped grooves 23 in a concentric circle form in the outer circumferential surface 21 of the insert 2*f* at the right and left end faces 22 thereof. The step-shaped groove 23 has an annular face 24 parallel to the radial direction and a ring face 25 parallel to the centerline.

Besides, in the insert 2*f*, if the ring face 25 has a width such that the O-ring 3 just achieves the height of the end face 22 when proper sealing pressure is added on the O-ring 3, the proper pressure is spontaneously added to the O-ring 3 by pushing the pressure pipe p1 or the pressure pipe p2 into the sleeve 1*a* or the sleeve 1*b* until its end face hits the end face 22.

The insert 2*f* has non-through holes 26 that are used to fix to the sleeve 1*a*. The sleeve 1*a* has holes 5 passing from the outer circumferential surface to the inner circumferential surface. The holes 5 are connected to the holes 26 of the insert 2*f* with the bolts 4.

When fixing the insert 2*f* to the sleeve 1*a* with the bolts 4, the inner circumferential surfaces of the annular face 24, the ring face 25 and the sleeve 1*a* form the bottom face and both side faces of the groove for the O-ring 3, respectively.

A thick O-ring is superior in stabilizing seal characteristics, because it has a small compression set compressibility is constant. According to the present example, it is possible to use the thick O-ring. In addition, the bolts 4*c* were used, because the pressure pipes p1, p2 have no screw threads in the holes. However, the holes h2 may have screw threads, and in that case, the bolts 4 are used.

Furthermore, in the insert 2*f*, if the ring face 25 has a width such that the O-ring just achieves in the width of the ring face when the proper seal pressure is imposed on the O-ring 3, the proper pressure is spontaneously imposed on the O-ring 3 by pushing the pressure pipe p1 or p2 into the sleeve 1a or 1b until its end face hits the end face 22.

EXAMPLE 20

Figure 21A:
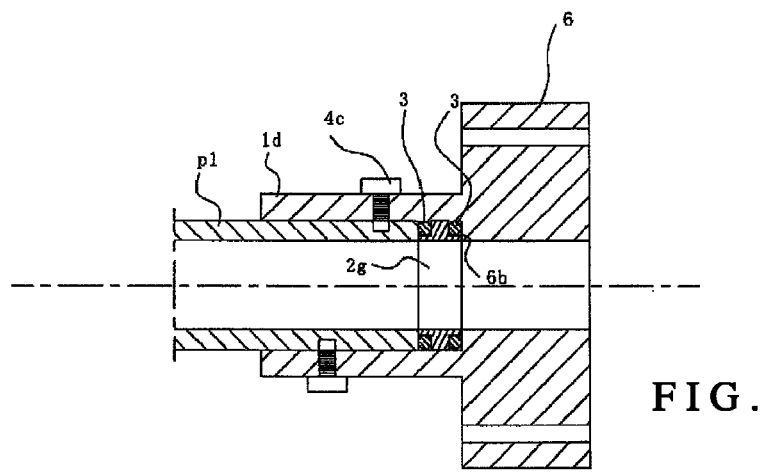
FIGS. 21A, 21B and 21C illustrate connecting structures according to nineteenth and twentieth embodiments.
Figure 21B:
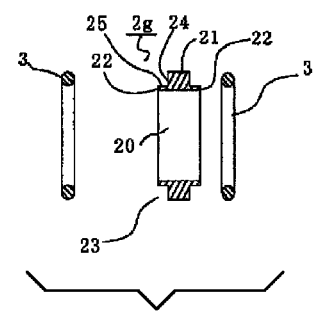

FIG. 21A shows an embodiment in which an insert 2g (FIG. 21B) is adapted to the connecting structure 103 of EXAMPLE 4 (FIG. 7). The insert 2g is formed as a ring as the insert 2f; its inner circumferential surface 20 has the same diameter as the inner circumferential surface of the pressure pipe p1; and its outer circumferential surface 21 has a diameter smaller than the inner circumferential surface of the sleeve 1d to some extent. A concentrically hollow step-shaped groove 23 is provided in the outer circumferential surface 21 at each of the end faces 22. The step-shaped groove 23 has an annular face 24 parallel to the radial direction and a ring face 25 parallel to the centerline. The insert 2g has no non-through holes 26, such as those shown in the insert 2f. The insert 2g does not need to be fixed, because it is sandwiched between the neck portion 6b and the pressure pipe p1. The holes h2 of the pressure pipes p1, p2 may have screw threads. In that case, the bolts 4 are used.

EXAMPLE 21

Figure 21C:
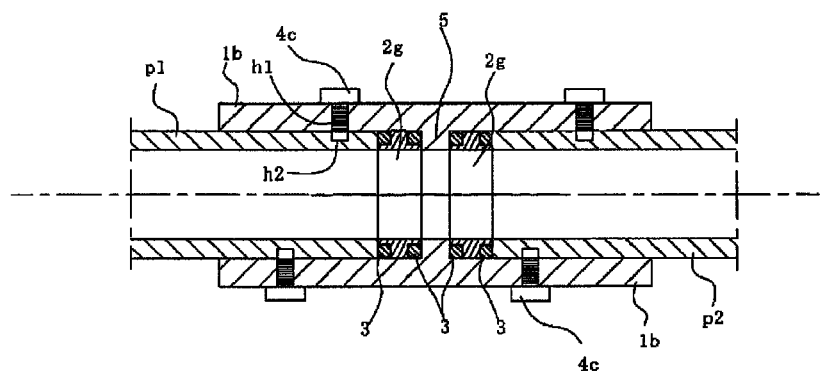

FIG. 21C shows a modification of the connecting structure 101 of EXAMPLE 2 in FIG. 5. In FIG. 21C, a screw thread is provided in the hole h1 of the sleeve 1b, and not provided in the holes h2 of the pressure pipes p1, p2, respectively. A ring-shaped neck portion 5 protrudes from the inner circumferential surface of the sleeve 1b, and the insert 2g is placed against the neck portion. The sleeve 1b is connected to the pressure pipes p1, p2 by the bolts 4c (FIG. 19). The O-ring of the insert 2g is compressed as mentioned previously. Since the holes h2 have no screw threads, the bolts 4c are used. However, the holes h2 may have screw threads. In that case, the bolts 4 are used.

EXAMPLE 22

Figure 22A:
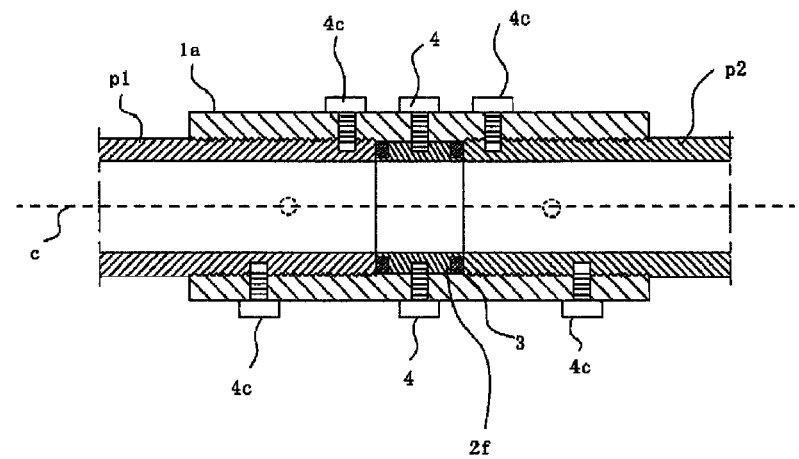
FIGS. 22A and 22B illustrate a connecting structure according to a twenty-first embodiment.
Figure 22B:
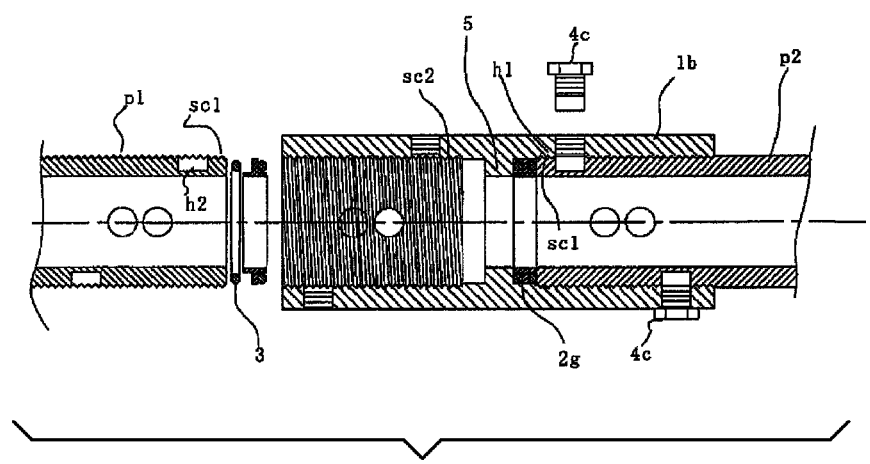

FIG. 22 shows a modification of EXAMPLE 16 in FIG. 18. In this embodiment, the O-ring 3 is compressed by screwing the pressure pipe p1 (or p2) into the sleeve to the insert 2f or 2g, which seals as in FIG. 16. Screw threads sc2 are provided along the full length of the inner circumferential surfaces of the sleeve 1a, 1b including the portion of the hole h1. On the other hand, screw threads sc1 that screw together with the screw threads sc2 are provided on the outer circumferential surfaces of the pressure pipes p1, p2. Pressure is put on the insert 2f or 2g by screwing the pressure pipe p1 or p2 into the sleeve 1a or 1b. Prestress is added to the O-ring by adjusting the amount of engagement.

In making the ring face 25 of the insert 2g to have such a width that the O-ring 3 fits in completely with proper seal pressure, the proper pressure is spontaneously imposed on the O-ring 3 by pushing the pressure pipe p1 or p2 into the sleeve 1a or 1b until its end face engages the end face 22 of the insert 2g. Since screw threads are not formed in the holes 2 of the pressure pipes p1, p2, the bolts 4c are used. However, the holes h2 may have screw threads. In that case, the bolts 4 are used.

EXPLANATION OF REFERENCED NUMERALS 100 to 105 connecting structure
1, 1a to 1i sleeve or sleeve portion
2 insert
3 O-ring
4, 4a bolt
5 neck portion
6 flange portion
7 detent
8 flange coupling
p1 pressure pipe
p2 pressure pipe

The invention claimed is:

1. A pressure piping assembly in which pressurized fluid flows, said pressure piping assembly comprising:
a cylindrical sleeve having a plurality of through holes, said through holes being provided at separate locations in a lengthwise direction and with identical angular intervals in a circumferential direction and without overlapping in the circumferential direction, said cylindrical sleeve having an interior space for receiving pressure piping and wherein a sum of the identical angular intervals between the plurality of through holes is 360 degrees;
a plurality of bolts for being inserted into the holes of the sleeve; and,
at least one pressure pipe having non-through holes being positioned at locations corresponding to the holes of the sleeve, whereby, when the at least one pressure pipe is inserted into the interior space of the sleeve, the non-through holes of the at least one pressure pipe communicate with the respective holes of the sleeve, and said bolts are inserted through the holes extending through the sleeve into the non-through holes.

2. A pressure piping assembly as claimed in claim 1, wherein the non-through holes each having a cylindrical smooth inner circumferential surface, each of said bolts has a portion without a screw thread to be inserted into the non-through hole, and when the at least one pressure pipe is inserted into the interior space of the sleeve, the at least one pressure pipe aligns with the sleeve such that the holes of the at least one pressure pipe communicate with corresponding holes of the sleeve.

3. A pressure piping assembly for conveying pressurized fluid, said pressure piping assembly comprising:
a cylindrical sleeve having a first end, a second end and a first set of through holes, said first set of through holes being provided at separate locations in a lengthwise direction and with identical angular intervals in a circumferential direction and without overlapping in the circumferential direction, said cylindrical sleeve having a first pressure pipe inserted into an interior of cylindrical sleeve from said first end and a second pressure pipe inserted into the interior from said second end and wherein a sum of the identical angular intervals between the first set of through holes is 360 degrees;
an insert for sealing the pressure pipes, said insert being located in the interior of the sleeve, sandwiched between the pressure pipes; and
a plurality of bolts for being inserted into the holes of the sleeve,
wherein said pressure pipes have a first set of non-through holes at locations corresponding to the holes of the sleeve, and wherein, when the pressure pipes are inserted into the interior of the sleeve, each non-through hole of the first set of non-through holes communicates with a corresponding through hole of the first set of through holes, and said bolts are screwed on the screw threads of holes in one of the first set of through holes and the first set of non-through holes.

* * * * *